3,275,614
PROCESS OF PRODUCING CIS - 1,4 - POLYBUTA-
DIENE WITH A CATALYST CONTAINING AN
ORGANIC IODINE COMPOUND
Gottfried Pampus and Nikolaus Schön, Leverkusen, and
Josef Witte, Cologne-Stammheim, Germany, assignors
to Farbenfabriken Bayer Aktiengesellschaft, Leverku-
sen, Germany, a German corporation
No Drawing. Filed July 25, 1962, Ser. No. 212,471
Claims priority, application Germany, Aug. 8, 1961,
F 34,636
3 Claims. (Cl. 260—94.3)

The present invention relates to a process for the manufacture of polybutadiene. More specifically the invention relates to an organo metal catalyzed polymerization of 1,3-butadiene and to a polymer comprising a distinct percentage of cis-1,4-polybutadiene having an improved processability.

Numerous organic metal catalysts have already been proposed for the polymerization of butadiene. The polymers thus obtained differ very greatly in their stearic build-up, i.e. in the arrangement of the monomer units within the macromolecules, according to the various catalysts used. For example, when organic lithium compounds are used, about 50 percent of the linkages are in the 1,4-cis position, 40 percent in the 1,4-trans position and 10 percent in the 1,2-position. Mixed catalysts obtained from titanium tetraiodide and cobalt produce polymers in which more than 90 percent of the monomer units are linked in the 1,4-cis position.

Apart from the major differences in the build-up of these polymers, the technological behaviour of the polymers is very similar. All polybutadienes described so far have a very low film strength while they are still in the state of a raw material. Within wide temperature ranges, they all tend to crumble when rolled and this results in poor distribution of filler. The adhesiveness of the raw materials and mixtures produced therefrom is very low, so that these products have even been described in the literature as anti-adhesives.

Owing to these difficulties in working with these products, it has hitherto not been possible to work up mixtures based on pure polybutadiene on an industrial scale so that it has been necessary to use mixtures with other elastomers, e.g. natural rubber or synthetic cis-1,4-polyisoprene or butadiene-styrene co-polymers.

In this process, however, the very good properties of polybutadiene are lost to a certain extent.

With butadiene polymers containing more than 95 percent 1,4-cis links, the said properties, namely poor sheet formation on rolling at elevated temperatures and low film strength, are, however, not so marked. From this and various other observations it has been concluded that to obtain products that can be conveniently worked up and which have a high film strength, it is necessary to use a polymer having 95 percent cis links. It was therefore not expected that polybutadienes having a relatively low 1,4-cis content could give the desired properties.

According to this invention an improved polybutadiene comprising cis-1,4-polybutadiene in the range of between 70 to 95 percent of weight is provided by polymerizing 1,3-butadiene in the presence of catalysts, which have been prepared by the reaction of titanium tetrachloride or titanium tetrabromide with lithium aluminium-tetra-alkyls and/or lithium aluminium alkyl hydrides in the presence of organic iodine compounds, the ratio of the components being so chosen that for each mol of titanium tetrachloride or titanium tetrabromide, 1 to 8 mols of iodine compound and 2 to 20 mols of lithium aluminium tetraalkyl or lithium aluminium alkyl hydride are used. The catalysts are used in such quantities that 0.015 to 1.5, preferably 0.05 to 5 parts by weight of titanium tetrachloride or titanium tetrabromide will be present for 100 parts by weight of butadiene.

By the term lithium aluminium tetraalkyls are to be understood compounds of the general formula

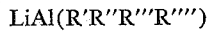

in which R', R'', R''' and R'''' may be the same or different aliphatic branched and/or unbranched radicals with 1 to 10 carbon atoms. Examples are $LiAl(C_4H_9)_4$, $LiAl(n-C_4H_9)(iso-C_4H_9)_3$ and $LiAl(n-C_8H_{17})(C_2H_5)_3$. By the term lithium aluminium alkyl hydrides are to be understood compounds or mixtures of compounds in which the overall composition corresponds to the formula $LiAlH_nR_{(4-n)}$, where $n$ lies between 0.5 and 3.5 and R represents the same or different aliphatic or cycloaliphatic, saturated or unsaturated hydrocarbon radicals with 1 to 10 carbon atoms. Examples are:

where $C_6H_9$ is a cyclohexenyl radical, $LiAlH(n-C_8H_{17})_3$ and $LiAlH_2(iso-C_4H_9)_2$. Suitable organic iodine compounds are primary, secondary or tertiary, mono- or polyfunctional alkyl iodides with 1 to 15 carbon atoms, which may, in addition, contain other halogens or ether groups. Examples are: Methyl iodide, ethyl iodide, n-butyl iodide, n-hexyl iodide, iso-propyl iodide, tertiary-butyl iodide, cyclohexyl iodide, benzyl iodide, iodoform, 1-chloro-4-iodobutane, 4-iodo-n-butylphenyl ether.

Catalysts particularly suitable for manufacturing the polymers according to the invention are obtained by using 1 to 5 mols of lithium-aluminium compound to 1 mol of iodine compound for a quantity of $TiCl_4$ lying within the limits given above. The types of links connecting the monomer units may be altered considerably without impairing the properties, by varying the composition of catalyst within the above limits and by suitable choice of the iodine compound.

With catalysts, the composition of which being in the limit of the molar ratios of the components according to the invention, polybutadienes may be obtained, having properties approximate to the known types of polybutadienes, but being distinguished by a strongly decreased cold flow from these known types of polybutadienes.

The polymers prepared with the catalysts according to the invention show in the crude state a behaviour very similar to that of natural rubber. Thus, the butadiene polymers prepared according to the invention have a high degree of self-adhesiveness not hitherto found in the known types of polybutadiene. Moreover, the polymers in the crude state have a film strength very similar to that of natural rubber. In addition, the polymers according to the invention may readily be treated on rollers; they show excellent formation of roller pelts over a wide temperature range, whereas the previously known types of polybutadiene have poor pelt formation and in any case form pelts only at temperatures below 40 to 50° C.

The catalysts may be prepared under the usual conditions in an aliphatic or aromatic solvent with exclusion of air and moisture, by mixing together a solution of titanium tetrachloride containing the iodine compound and a solution or suspension of lithium aluminium compound. At temperatures of about 0 to 50° C., the reaction product obtained is a blackish brown suspension, which is used as catalyst. The monomeric butadiene should not contain substantial quantities of substances which react with the catalyst and render it inactive. Care should also be taken to exclude water, oxygen, carbon dioxide, acetylene, etc.

If the polymer is to be prepared from a butadiene which contains more than 100 p.p.m. of acetylenes or allenes, the proportion of lithium aluminium compound in the catalyst mixture should be increased correspondingly.

Particularly suitable for the manufacture of the catalysts and for carrying out the polymerization are aliphatic or aromatic hydrocarbons or their mixtures, e.g. butane, hexane, octane, petroleum ether, ligroin, hydrogenated diesel oil, cyclohexane, benzene, toluene or xylene. The same degree of purity is necessary for these solvents as for the butadiene.

The polymerization according to the invention may be carried out at any temperatures in the region of $-40$ to $+80°$ C. It is preferable to use a temperature range of $0-50°$ C. Polymerization may be carried out at normal, reduced or excess pressure. The reaction may be carried out in the presence of an inert gas such as nitrogen, helium, argon or hydrocarbon vapours.

The polymerization of butadiene with the described catalysts may be carried out either discontinuously or continuously. For discontinuous operation, autoclaves with stirrers which permit the operation to be carried out with the exclusion of air and moisture are suitable. For continuous operation a worm to which additional polymerization vessels may be connected may be used.

The recovery of the polymer, the deactivation and, if necessary, removal of catalysts may, for example, be effected by treatment with alcohols, water, acetone or mixtures of these substances, if necessary, in the presence of organic and/or inorganic acids and bases. These substances may be used in such quantities that precipitation of the polymer does not at first occur. In the course of recovering the polymer, stabilizers and antioxidants such as phenyl-$\beta$-naphthylamine, N,N'-diphenyl-p-phenylenediamine, di-tertiary-butyl-p-cresol, di-tertiary-butyl-hydroquinone and tri-(nonylphenyl)-phosphite, and buffers such as calcium stearate etc. may be added.

Paraffinic or naphthenic oils as well as alkyd resins or phenol-formaldehyde condensates may also be added during the process.

The polybutadiene prepared according to the invention is distinguished from the previously known types of polybutadiene by having the following important advantages:

High film strength of the raw material and of the unvulcanized mixtures prepared from it, excellent formation of pelts on rolling at all temperatures used industrially, good uptake and distribution of fillers, high adhesion to materials and good spraying properties of the mixtures.

The excellent properties of the material can be fully utilized because it is not necessary to mix the material up with other elastomers. The advantages of the polybutadiene according to the invention compared with the types of polybutadienes at present available may be seen from the experimental results given in Example 4.

In the following examples, the parts given are parts by weight.

EXAMPLE 1

0.570 part of titanium tetrachloride and 1.02 parts of isopropyliodide are dissolved in 260 parts of cyclohexane in a vessel with stirrer, with exclusion of air and moisture, and the mixture is reacted with 2.52 parts of lithium-aluminium-butyl-triisobutyl with stirring at room temperature. After cooling to $4°$ C., a solution of 300 parts of butadiene in 600 parts of cyclohexane is absorbed by suction and polymerized at 10 to $14°$ C. The butadiene

TABLE 1

| Experiment No. | Iodine compound R-I | Molar ratio calculated on TiCl₄ | | Yield, percent | $\eta$-value | Linkage of monomer units, percent | |
|---|---|---|---|---|---|---|---|
| | | RI | LiAlC₄H₉(iso-C₄H₉)₃ | | | 1,4 | 1,2 |
| 1 | R=—CH(CH₃)₂ | 2.5 | 4.0 | 67 | 2.6 | 94 | 6 |
| 2 | R=—CH(CH₃)₂ | 2.0 | 3.0 | 98 | 2.9 | 89 | 11 |
| 3 | R=—CH(CH₃)₂ | 1.6 | 2.4 | 72 | 3.3 | 88 | 12 |
| 4 | R=—CH(CH₃)₂ | 1.0 | 3.0 | 86 | 3.2 | 92 | 8 |
| 5 | R=—C₆H₅ | 1.4 | 1.8 | 57 | 2.5 | 86 | 14 |
| 6 | R=—C₆H₅ | 1.6 | 2.4 | 81 | 2.8 | 88 | 12 |
| 7 | R=—C₆H₅ | 1.6 | 3.0 | 89 | 3.0 | 89 | 11 |
| 8 | R=—C₆H₅ | 2.1 | 3.2 | 93 | 2.6 | 91 | 9 |
| 9 | R=—CH₂—C₆H₅ | 1.3 | 2.4 | 95 | 2.4 | 92 | 8 |
| 10 | R=—CH₂—C₆H₅ | 1.6 | 3.0 | 82 | 3.1 | 94 | 6 |
| 11 | R=—CH₂(CH₂)₄—CH₃ | 2.0 | 2.4 | 51 | 3.7 | 73 | 27 |
| 12 | R=—CH₂(CH₂)₄—CH₃ | 2.6 | 3.2 | 66 | 2.3 | 82 | 18 | used contained 80 p.p.m. of methylacetylene and 100 p.p.m. of 1,2-butadiene. Polymerization is complete after 10 hours. The catalyst is deactivated by stirring in 15 parts of methanol and 3 parts of N,N'-diphenyl-p-phenyl-enediamine, and the polymer is then precipitated with methanol and dried in vacuo. 285 parts of polybutadiene are obtained which are soluble in toluene without residue and had good self-adhesive properties and high film strength. The $\eta$-value is 3.2. The infra-red spectrum shows the following structure: 74.4 percent 1,4-cis, 17.2 percent 1,4-trans and 8.5 percent 1,2.

EXAMPLE 2

Polymerization experiments were carried out under the same reaction conditions as in Example 1 with various iodine compounds and various molar ratios. 0.570 part (=3 millimols) of titanium tetrachloride is used for each experiment. The molar ratio of the alkyl iodide and of the lithium aluminium alkyl is calculated with respect to the titanium tetrachloride. The results are shown in Table 1.

EXAMPLE 3

1.200 parts of petroleum ether boiling in the range of 40 to 60° C. are placed into a stainless steel autoclave with stirrer, with the exclusion of air and moisture, and a catalyst suspension is added which has been prepared in a stirring flask as indicated in Example 1 in 400 parts of petroleum ether from .855 part of titanium tetrachloride, 1.52 parts of isopropyl iodide and 2.74 parts of lithium-aluminium-n-hexyl-triethyl. 500 parts of butadiene are then added under pressure, and the temperature is kept at 20 to 25° C. by external cooling means. After 12 hours, 8 parts of ditertiary butyl-hydroquinone is added to the polybutadiene solution so obtained and the latter is washed several times with water to which 0.02% of an ester amine has been added.

After evaporating off the solvent, 420 parts of polybutadiene having an $\eta$-value of 3.4 are obtained. The polybutadiene produces a smooth pelt at a rolling temperature of 80 to 90° C. and can be converted to a mixture producing smooth bearing surfaces without the addition of foreign elastomers.

EXAMPLE 4

The polybutadiene according to the invention prepared as described in Example 2 with a catalyst of the composition indicated in Experiment 1 of Table 1 was compared with a known polybutadiene in the following tests:

(a) Tests on the raw material

| | Polybutadiene of the invention | Known Polybutadiene |
|---|---|---|
| Plasticity (Mooney ML 4', 100° C.) | 40 | 40. |
| Results of rolling at 20° C | Smooth pelt | Smooth pelt. |
| Results of rolling at 80° C | ___do___ | Crumbling. |
| Results of rolling at 100° C | ___do___ | Do. |
| Results of rolling at 120° C | ___do___ | Do. |
| Film strength on traction | Good | Very low. |
| Adhesiveness of the raw material (1=very adhesive, 5=non-adhesive). | 2-3 | 5. |

(b) Tests on the mixture

From each type of polybutadiene, a mixture of the following composition was prepared on rollers. The temperature of the surface of the roller was 60 to 70° C., the roller chains ran at a velocity of 24 and 28 revolutions per minute respectively, and the quantities given are parts by weight calculated on 100 parts by weight of elastomer.

Polybutadiene _____ 100
Stearic acid _____ 1.5
Zinc oxide _____ 5.0
High abrasion furnace black _____ 48.0
Plasticiser (aromatic mineral oil) _____ 10.0
Adhesifier (colophonium) _____ 5.0
Fatigue resisting agent (p-phenylenediamine derivative) _____ 0.75
Age resister _____ 0.75
Paraffin _____ 0.6
Sulfur _____ 1.8
Vulcanisation accelerator (N-cyclohexyl-mercaptobenzthiazole sulfenamide) _____ 0.9

| | Polybutadiene of the invention | Known Polybutadiene |
|---|---|---|
| Behaviour of the mixture | Very good | Mixtures crumble or fall from the rollers. |
| Distribution of filler | Good | Poor. |
| Appearance of pelt | Smooth and shiny. | Blunt and uneven. |
| Adhesiveness (1=very adhesive, 5=non-adhesive). | 2-3 | 5. |
| Vulcanization velocity (optimum vulcanization at 4.0 atmospheres excess pressure (=151° C.) measurement with vulcameter). | 30 minutes | 30 minutes. |

(c) Examination of the vulcanisate

| | Polybutadiene of the invention | Known Polybutadiene |
|---|---|---|
| Tear strength (kg./cm.²) | 165 | 130 |
| Elongation, percent | 450 | 380 |
| Hardness (Shore) | 59 | 63 |
| Recoil elasticity | 49 | 51 |
| Notched impact strength (kg. abs 4 mm.) | 18 | 14 |
| Dynamic heating Goodrich Flexometer, ° C. after 25 minutes | 50 | 51 |
| Abrasion resistance DIN (mm.³) | 22 | 45 |

EXAMPLE 5

(a) *Preparation of a lithium-aluminium alkyl hydride.* 10 parts of lithium-aluminum-hydride and 60 parts of vinyl cyclohexane are mixed with 80 parts of isopropylbenzene and heated with stirring with a rapid stirrer to 125° C. After completion of the exothermic reaction, stirring is continued for 30 minutes at 120° C., and after cooling the mixture is treated with 160 parts of toluene and filtered. An approximately molar solution of a lithium aluminium alkyl hydride of the analytical composition $LiAlH_{1.7}(C_8H_{13})_{2.3}$ is obtained, which is used directly for the production of the catalyst.

(b) As described in Example 1, a catalyst suspension is prepared from 0.283 part of titanium tetrachloride, 0.204 part of isopropyl iodide and 0.618 part of $LiAlH_{1.7}(C_8H_{13})_{2.3}$. The polymerization of 200 parts of butadiene corresponding to Example 1 yields 115 parts of polybutadiene having a viscosity value of 2.1. The product has excellent film strength and good adhesivesness and produces a closed smooth pelt on a mixing roller at 100° C.

EXAMPLE 6

0.96 part of titanium tetrabromide and 1.02 parts of isopropyl iodide are dissolved in 300 parts of cyclohexane in a reaction vessel with stirrer, with the exclusion of air and moisture, and the solution is treated with 1.645 parts of lithium-aluminium butyl-triisobutyl. 250 parts of butadiene in 750 parts of cyclohexane are added, and polymerization is allowed to proceed for 8 hours at 4 to 8° C. The product is worked up as described in Example 1, and 170 parts of a tough elastic polybutadiene are obtained. The polybutadiene is soluble without residue in toluene and many be used without the addition of added elastomers. The good adhesiveness of the product may be further improved by the addition of 2.5 parts of a soluble phenol-formaldehyde resin.

EXAMPLE 7

A catalyst solution is prepared according to Example 6 in 300 parts of cyclohexane form 0.286 part of titanium tetrachloride, 0.591 part of iodoform and 1.651 parts of lithium aluminium butyl-triisobutyl. The polymerization of 250 parts of butadiene in the manner described in Example 6 yields 241 parts of polybutadiene with a viscosity value of 2.8 and 94% 1,4-linkages. The product has very good film strength and good adhesiveness.

EXAMPLE 8

1000 parts of toluene are filtered through previously annealed aluminium oxide and treated with 180 parts of butadiene with exclusion of air and moisture. 1.21 parts of lithium aluminium triisobutyl-butyl, 0.19 part titanium tetrachloride and 0.744 part isopropyliodide are then added with stirring at 15° C. Polymerization begins after a few minutes and is completed after 3 hours. The product contains 92.3% 1,4-cis linkages and has an $\eta$-value of 3.4. After addition of 5 parts of a low molecular weight cresol-formaldehyde condensate, the solvent is removed with steam, and 178 parts of a tough elastic polymer with very good properties for working up are obtained.

EXAMPLE 9

1500 parts of toluene, treated as in Example 8, are used for the manufacture of a catalyst from 0.19 part of titanium tetrachloride, 0.413 part of tertiary butyl iodide and 0.65 part of lithium aluminium-butyl-triisobutyl. 240 parts of butadiene are then added and polymerization is continued for 5 hours at 15 to 20° C. The polybutadiene obtained contains 89.7% 1,4-cis linkages and has a $\eta$-value of 3.8. After addition of 1.8 parts of a phenolic stabilizer, 10 parts of an aromatic oil and 3 parts of resinic acid, the solvent is removed with steam. 250 parts of a polymer are obtained which may readily be worked up at 80° C. as described in Example 4.

We claim:

1. A process for the manufacture of an improved rubbery polybutadiene containing 70–95% of 1,4-cis linkages comprising polymerizing 1,3-butadiene in the presence of a catalyst prepared by combining (a) an organo-lithium compound selected from the group consisting of a lithium-aluminium-tetraalkyl and a lithium-aluminium-alkyl hydride, (b) a halide of titanium selected from the group consisting of titanium tetrachloride and titanium tetrabromide, and (c) an organic iodine compound selected from the group consisting of a $C_1$ to $C_{10}$ alkyl iodide, an aryl iodide and a cycloalkyl iodide, the mol ratio of the lithium compound to the organic iodine compound ranging from about 1:1 to about 5:1, the titanium halide being present in an amount from about 0.015 to 1.5 parts by weight per 100 parts by weight of 1,3-butadiene, and carrying out the polymerization of said 1,3-butadiene in an inert hydrocarbon diluent at a temperature between about −40° and about +80° C., and recovering the polymer from solution.

2. The process of claim 1 in which the organo-lithium compound is lithium-aluminum-butyl-triisobutyl.

3. The process of claim 1 in which the organic iodine compound is isopropyliodide.

References Cited by the Examiner

UNITED STATES PATENTS

| | | | |
|---|---|---|---|
| 2,944,048 | 7/1960 | Nowlin et al. | 260—94.9 |
| 3,027,360 | 3/1962 | Raum | 260—94.9 |
| 3,072,630 | 1/1963 | De Jong et al. | 260—94.9 |
| 3,101,328 | 8/1963 | Edmonds | 260—93.7 |
| 3,118,864 | 1/1964 | Robinson et al. | 260—94.3 |

FOREIGN PATENTS

| | | |
|---|---|---|
| 591,994 | 12/1960 | Belgium. |
| 1,256,231 | 2/1961 | France. |
| 776,326 | 6/1957 | Great Britain. |

OTHER REFERENCES

Engel: Rubber and Plastics Age, October 1961, pages 1215–1221.

JOSEPH L. SCHOFER, *Primary Examiner.*

E. J. SMITH, *Assistant Examiner.*